G. S. COLLIS.
Faucet-Bushes.
No. 148,810. Patented March 24, 1874.
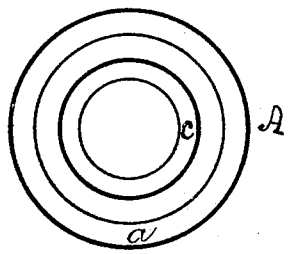 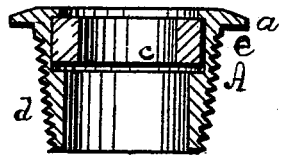 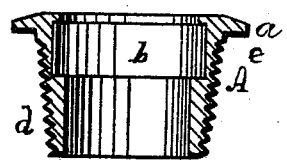
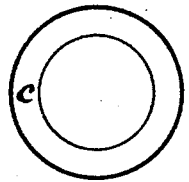
WITNESSES:
INVENTOR
George S. Collis

UNITED STATES PATENT OFFICE.

GEORGE S. COLLIS, OF RIVERSIDE, ILLINOIS.

IMPROVEMENT IN FAUCET-BUSHES.

Specification forming part of Letters Patent No. 148,810, dated March 24, 1874; application filed November 24, 1873.

*To all whom it may concern:*

Be it known that I, GEORGE S. COLLIS, of Riverside, in the county of Cook and State of Illinois, have invented a new and useful Improvement in Bush for Faucet-Holes and Barrels, of which the following is a full description, reference being had to the accompanying drawings, in which—

Figure 1 is a plan view; Fig. 2, a vertical section, showing an elastic packing inserted; Fig. 3, a vertical section with the packing removed. Fig. 4 represents a plan view of the packing.

My invention consists in providing a metallic bush for the faucet-holes of barrels, having a suitable packing, which will prevent leakage and hold the faucet in place when inserted. The bush itself can most conveniently be made of malleable iron, and I think india-rubber the most suitable material for the packing-ring.

In the drawings, A represents a metal bush, made somewhat tapering, and provided with a screw-thread, $d$, upon the outside. The upper part of the interior is recessed or cut away, as shown in Figs. 2 and 3, in such manner as to form a shoulder both at the bottom and top. Within this recess $b$ I place a rubber, or other somewhat elastic ring, $c$, of such size that when in place it will come in contact with both the upper and lower shoulders. $c$ represents this packing or ring; it is shown in position in Fig. 2. The bush may be provided with a flange, $a$. The shoulder at the bottom of the recess $b$ holds the packing in place while the faucet is being inserted, and when it is withdrawn the outer shoulder prevents the removal of the packing with the faucet. The packing-ring may be made of cork, wood, soft metal, or other similar material, but when made of soft metal the ring would have to be changed very frequently; hence an elastic ring is preferable. By the use of this bush the faucet-hole is perfectly protected from wear. The faucet can be easily inserted and removed. The elastic ring $c$ effectually prevents leakage, and in case this ring should wear it can be easily replaced.

What I claim as new is as follows:

The bush A, having a recess, $b$, with a shoulder at both the top and bottom, in combination with the elastic packing $c$, thereby avoiding the internal screw-thread in the bush, as and for the purpose herein specified.

G. S. COLLIS.

Witnesses:
   E. A. WEST,
   O. W. BOND.